Nov. 10, 1931.   C. A. BLODGETT ET AL   1,831,435
METHOD FOR THE PREPARATION OF ALPHA CELLULOSE PULP
Filed Feb. 12, 1926
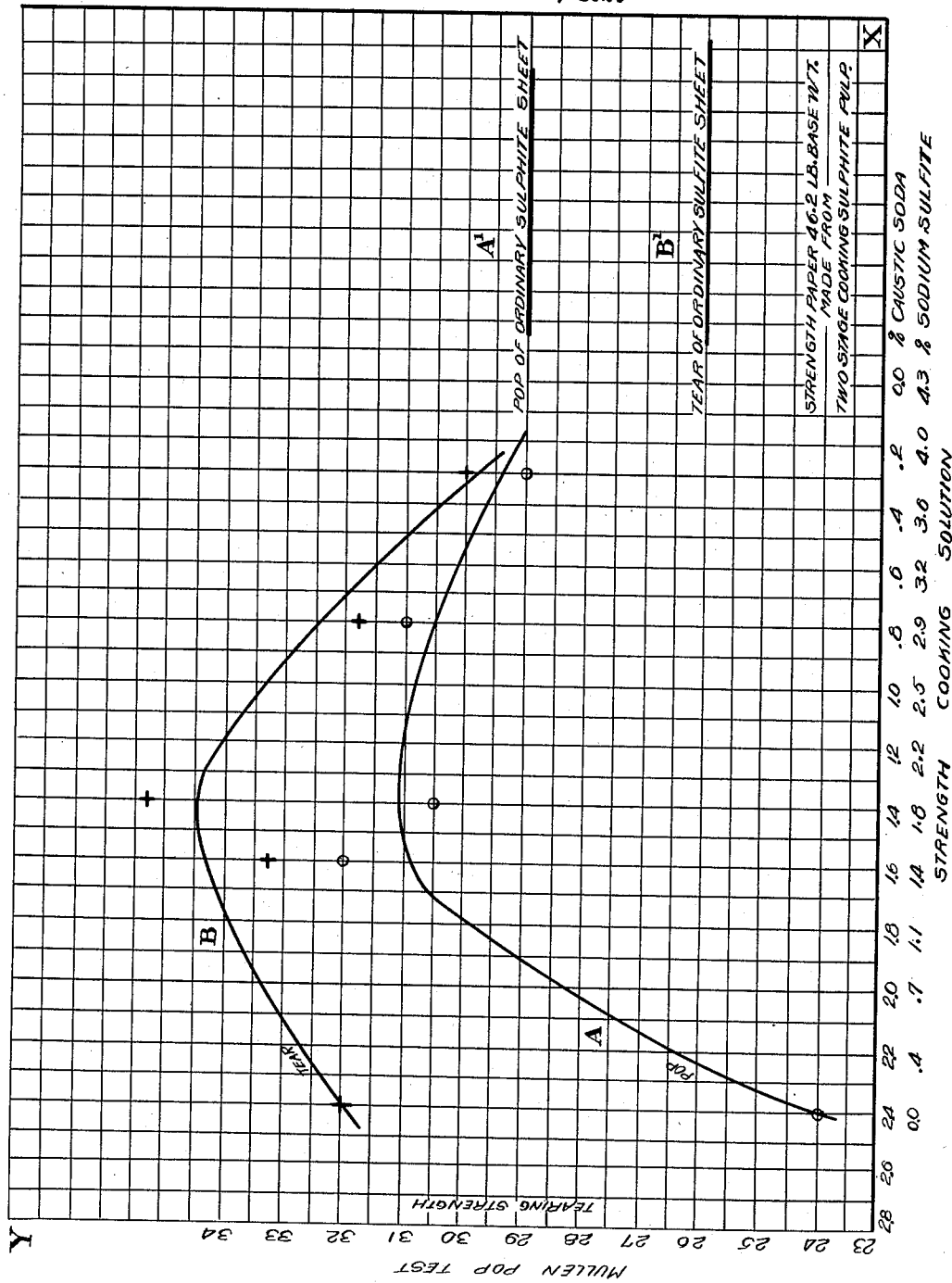

Patented Nov. 10, 1931

1,831,435

UNITED STATES PATENT OFFICE

CHARLES A. BLODGETT, OF SOUTH BREWER, AND HUGO H. HANSON, OF BANGOR, MAINE, ASSIGNORS TO EASTERN MANUFACTURING COMPANY, OF SOUTH BREWER, MAINE, A CORPORATION OF MASSACHUSETTS

METHOD FOR THE PREPARATION OF ALPHA CELLULOSE PULP

Application filed February 12, 1926. Serial No. 87,806.

This invention relates to a method for the reduction of cellulosic raw materials to the condition of pulp, characterized by having but slight effect upon the original cellulosic compounds and resulting in a strong fibrous pulp of high purity with respect to its more resistant or alpha cellulose content.

The various processes at present employed for the preparation of wood pulp, as in the manufacture of paper and like products,—are generally distinguished by the means or reagents which they employ. Thus there are the mechanical process (in which disintegration of the wood is effected by mechanical grinding of the same into a pulp) and the chemical processes, which include the sulfate, sulfite and soda processes, in which the raw material (usually in the form of chips) is treated with a liquor containing an alkali sulfide, a sulfite, or caustic soda, respectively. The latter group, or chemical processes, may also be broadly differentiated from one another according to the acid or alkaline characteristics of the solution used therein. Upon this basis, the sulfite processes are fundamentally acid processes of treatment, whereas the soda and sulfate processes are caustic or alkaline.

As contrasted in terms of the relative effects upon the woods to which they may be applied, the mechanical process merely results in the physical comminution of the woods without otherwise affecting their general physical or chemical properties, whereas the chemical processes, so-called, accomplish, in addition, the substantial dissolution and removal of soluble materials from the wood fiber.

The caustic or soda process is actively effective to dissolve resins and the like, as well as lower forms of cellulosic material. However, it also causes the progressive degradation of the more resistant cellulosic constituent, namely the alpha cellulose, into more reactive and soluble forms, and hence tends to produce a soft pulp of weak fibers.

The acid or sulfite processes, on the other hand, effect the separation and removal of constituents of the wood, including lignin bodies and part of the resins, as well as certain celluloses such as the hemicelluloses or pentosans, but the reagents of these processes are relatively inactive both physically and chemically, toward the true or alpha cellulose compounds of the cellulosic raw material. Accordingly, in the sulfite processes as commonly conducted for the preparation of paper pulp, the sulfite cook, or digestion with an alkali or alkaline earth bi-sulfite solution with heat and pressure, may be continued for a relatively long period of time at relatively high temperatures and pressures resulting in a soft or so-called "easy bleaching" pulp which may have an appreciably modified physical structure but which still consists substantially of pure (e. g. 86%) alpha cellulose. For the purposes of this invention, the cook may, advantageously, be stopped before such ultimate degree of reduction, when the formation of a "prime strong" pulp has been reached (as is common practice for the preparation of strong fiber) which is known as a "raw cook." At this stage, substantially all of the soluble, incrusting impurities are found to be removed but only an incomplete purification of the fibers has taken place.

While the caustic or soda process typically results in pulps which are soft, highly reduced, and associated with a relatively large proportion of so-called degraded cellulosic compounds, etc., and contain fiber which is not only weak per se but which forms a weak paper of soft and absorbent qualities,—the acid or sulfite processes may be so conducted as to produce a pulp which, though not so completely freed from the substances originally associated therewith, nevertheless contains a lower proportion of the degraded cellulosic compounds and is much stronger and may in turn be converted into paper or like products which are characterized by improved strength and uniformity of composition, and other desirable properties.

It is an object of this invention to provide a process for preparing cellulose which shall not only possess a very high degree of strength as for paper making etc., but which shall also be of high purity and color, and likewise adaptable for those purposes where cellulose of high alpha-cellulose content is desirable,—as for example in the chemical conversion of the same to cellulosic derivatives such as the esters and ethers. Other objects will appear from the following disclosure.

The present invention is especially applicable to pulps prepared by the sulfite process (or other equivalent procedure whereby the cellulosic raw material is pulped without substantial modification) in which the raw material is first reduced to a subdivided condition in the presence of an acid reagent,—usually the bi-sulfite of one or more of the alkaline earths,—and includes a second stage of treatment of the pulp thus obtained, which is characterized by subjecting the pulp to the action of a solution containing a reactive sulfur compound (as more fully hereinafter defined and preferably alkaline or rendered so by appropriate additions)—followed by freeing the pulp from the several reagent materials used. (A bleaching of the pulp may be effected in the usual manner or an especially satisfactory bleaching of the pulp may be attained by the procedure disclosed and claimed in copending application of Charles A. Blodgett, Serial No. 88,684, filed February 16, 1926.)

For effecting the purposes of the invention in actual practice, the preliminary treatment may, as already indicated, be advantageously restricted in degree or duration or both, to such an extent as to leave the fibrous structure thereof substantially unaffected and the non-cellulose admixtures incompletely removed, (as in pulps resulting from a "raw cook" and known as "prime strong"). Alternatively, the preliminary treatment may be more actively conducted or more prolonged so as to produce a pulp somewhat weaker and of softer texture and containing less of the wood residue other than cellulose, in which case it is characterized in the trade as "easy bleaching." The procedure followed in any given instance will obviously be made to depend upon the corresponding ultimate result desired.

For conserving strength of fiber and at the same time attaining the production of a pulp of high strength as well as of high purity, however, it is now found to be desirable and practicable, by the procedure herein disclosed, to give the raw material a comparatively short acid treatment,—even shorter for example or less active than that usually employed in making a "prime strong" sulfite pulp,—followed by washing the reagent materials therefrom.

The pulp, as thus obtained, is then subjected to the second stage of treatment, which is characterized by the employment of a reactive compound of sulfur, preferably in an alkaline and reducing solution.

In the term "reactive compound of sulfur" is comprehended a compound or compounds of sulfur in which the sulfur constituent or radical is susceptible of reaction with contaminant cellulosic substances present, as manifested for example by the formation of soluble compounds therewith. Suitable compounds, falling within this definition, generically include those containing one or more atoms of sulfur which are characterized by manifesting a lower valence (for example 2 or 4) in association with the molecular structure of the compound and are generally reactive in the manner described when in an alkaline medium. The alkaline medium may be provided by the basic composition of the compound itself or by the positive addition of an alkaline reagent thereto. Obviously, a further qualification of such compounds, in order to be considered applicable for the purposes of the invention, is that they shall be soluble,—and for practicable application that they shall exhibit ready solubility in water.

On the other hand, insoluble compounds of sulfur and compounds in which the sulfur component exerts a high valence, as in the sulfates for example, are ineffective for the purposes of this invention and are not to be included by the term "reactive compound of sulfur" as employed in the specification and claims.

A preferred and typical reactive compound of sulfur is sodium sulfide (or poly sulfide) which is intrinsically basic and which in solution provides an alkaline medium in which its desired association reaction with active derivatives of cellulose is readily effective. Again, sodium sulfite, to which a soluble alkali may be added such as sodium hydroxide, is also adapted to the purposes and application of the invention. Other compounds of sulfur of analogous composition or having a like form of reactive sulfur in their molecular constitution may likewise be employed.

A representative procedure in the practical application of the invention will be described with particular reference to coniferous woods such as spruce, although it is to be understood that the usual sulfite pulps of commerce are applicable irrespective of how prepared.

In an illustrative procedure, to which the invention is by no means limited: the raw wood is first reduced mechanically to the condition of chips and the chipped wood is then mixed with a sulfite liquor of the usual concentration (containing, e. g. 0.6% $SO_2$ as $Ca(HSO_3)_2$, 0.4% $SO_2$ as $Mg(HSO_3)_2$, and 3%–5% $SO_2$ in the form of free sulfurous acid) and in the proportions of 1½ gallons liquor to 1 lb. of the air dry pulp, and then subjected to heating, to a final pressure and temperature of the order of 65–70 lbs. per square inch and 295° F., respectively. Preferably, the degree of digestion and of the conversion and removal of associated impurities may be such as is indicated by a final acid concentration equivalent to 0.14% to 0.20% free $SO_2$.

The thus obtained "raw cooked" pulp is washed and screened, after which it may be first shaped into wet laps or may be passed through a thickener and thence directly to the subsequent operations.

The apparatus employed for the second stage of treatment may conveniently consist of the usual form of rotary boiler used for boiling rags. Into this the pulp is charged in the approximate proportions of 1 part of air dried pulp to 15 parts, more or less, by weight of the liquor, containing, e. g. a relatively dilute aqueous solution of some 3% of reagents more or less in the aggregate and preferably, in a specific instance, approximately equal parts sodium sulfite and of sodium sulfide. The charge as thus prepared is heated slowly, and preferably with agitation as by rotation of the boiler, at a rate conveniently governed by the indicated steam pressure or by the temperature. In a given instance of satisfactory control, for example, the temperature indicated at the end of the first 15 minutes was 150° F., at the end of an hour 230° F., at the end of two hours 264° F., and at the end of two hours and forty-five minutes 272° F., when the cook was considered sufficiently effective upon the pulp, and the heating and digestion were discontinued.

In certain cases, especially where a maximum alpha cellulose content is desired, a still further removal of the impurities may be effected by prolonging the heat treatment at or about the highest temperature above stated for a further period of time. At the end of the cooking period, the charge may be blown into a draining vat, and the liquor withdrawn from the pulp, which pulp is washed with a quantity of fresh water. If the washing is carefully done, the original liquor and washings thus produced may be re-used, with addition of fresh reagent, or concentrated for recovery in other ways, with economy. After washing, there is left a purified pulp, high in its content of alpha-cellulose, which is usually above 90% in commercial practice.

The pulp may now be carried direct to the customary treatments or processes for working the same up into paper stock and the like, or it may be employed for chemical purposes, as in the manufacture of cellulosic compounds. For many purposes, however, it is desirable to further bleach the pulp, especially when a high colored, or perfectly white, pulp and final product are desired. This may advantageously be effected by the process disclosed in copending application already referred to.

In the latter case, the pulp may be subjected to a brief reducing bleach, as by treatment with sodium bi-sulfite, followed by a mild oxidizing bleaching treatment, as with bleaching powder. The oxidizing bleach reaction is expended or else checked short of its complete reactivity, preferably by controlling the bleaching reagent initially added to such proportions as to impart an incomplete bleaching effect only and calculated to expend itself before appreciable oxidation of the cellulosic substance of the pulp occurs. This treatment is preferably followed by a reducing bleach, as by the addition of sulfur dioxide or fresh bi-sulfite liquor, whereupon certain oxidized or chlorinated constituents of the pulp are destroyed or converted to white substances probably in the nature of addition products, and a pure, brilliant white, undegraded alpha-cellulose pulp results.

In either case, that is to say, with or without a bleaching procedure,—a pulp of high alpha-cellulose content is produced, characterized by great strength of fiber,—as evidenced by paper made therefrom,—and by relative freedom from degraded celluloses.

Where fiber-strength and structure are less important the sulfite digestion or cook may with advantage be somewhat altered, as for example, to the point of producing a "prime strong" pulp, or even to the extent of forming an "easy bleaching" pulp.

The specific composition of the treating solution above described is especially satisfactory where sodium sulfite and caustic soda are employed and it is to be understood that they may be partially or wholly replaced by other reactive compounds of sulfur, as above defined, as equivalents.

It is further to be noted that, with the solution described,—if the ultimate sodium content is taken as constant but the relative proportions of sulfite and hydroxide are varied from the optimum, the strength of paper made from the pulp treated therewith falls off from a given maximum value. This is illustrated by the accompanying chart in which the tearing strength of paper made from the pulp is plotted along the Y-axis and the concentration or proportion of the sulfur reactive compound (sodium sulfite) used in the preparation of the pulp is plotted along the X-axis. Trace A approximates the results indicated by the well-known Mullin pop test method and Trace B indicates the results obtained by the "tear" method. The usual values obtained by these methods upon ordinary sulfite pulp sheets are shown at A' and B' respectively. This chart applies to bleached pulps.

It will be noted that with increasing amounts of sodium sulfite and decreasing amounts of alkali, the strength of paper treated therewith rapidly increases, as determined by both methods of testing, to a maximum value at approximately 1½% of each reagent, and that therebeyond the strength of the paper rapidly falls off. It is also remarkable that the tear test is, throughout the range of values plotted, much higher than the value manifested by the ordinary sulfite sheets.

It is to be understood that various modifications of the procedure, as herein described, may and ordinarily will be introduced in practice, to meet the exigencies of commercial operations or to effect a given result,—but such modifications are to be considered as comprehended by the above description and included within the terms of the following claims.

We claim:

1. A process for the treatment of cellulosic materials, comprising reducing the same to the condition of a pulp in the presence of an acid sulfite liquor, arresting the reaction of the liquor short of normal sulfite treatment, subjecting the resulting pulp to an alkaline liquor made from approximately equal proportions of a sulfite and an alkaline compound of an alkali metal, and subsequently separating the soluble products of reaction from the residual cellulosic solids.

2. A process for the treatment of cellulosic materials, comprising reducing the same to the condition of a pulp in the presence of an acid sulfite liquor, arresting the reaction of the liquor short of normal sulfite treament, subjecting the resulting pulp to an alkaline liquor made from approximately equal proportions of a sulfite and an alkaline compound of an alkali metal in the aggregate concentration of approximately 3% by weight, and subsequently separating the soluble products of reaction from the residual cellulosic solids.

3. Process for the obtainment of commercially pure alpha cellulose from wood-fibre, which comprises mixing washed raw cooked sulfite pulp in a solution of approximately three per cent strength of approximately equal proportions of sodium sulfite and sodium hydroxide, the ratio of air dry pulp to said solution being of the order of one to fifteen, by weight, heating the mixture, with agitation, with slow rise of temperature, under pressure in approximately two hours and forty five minutes, thereafter washing the pulp free of water soluble components.

4. A process for the treatment of cellulosic materials, comprising reducing the same to the condition of a pulp in the presence of an acid sulfite liquor, subjecting the resulting pulp to an alkaline liquor made from approximately equal proportions of a sulfite and an alkaline compound of an alkali metal, and separating the soluble products of reaction from the residual cellulosic solids.

5. A process for the treatment of cellulosic materials, comprising reducing the same to the condition of a pulp in the presence of an acid sulfite liquor, subjecting the resulting pulp to an alkaline liquor made from approximately equal proportions of a sulfite and an alkaline compound of an alkali metal, in the aggregate concentration of approximately 3% by weight, and separating the soluble products of reaction from the residual cellulosic solids.

6. A process for the treatment of cellulosic materials, comprising reducing the same to the condition of a pulp in the presence of an acid sulfite liquor, arresting the reaction of the liquor short of normal sulfite treatment, subjecting the resulting pulp to an alkaline liquor made from approximately equal proportions of a sulfite and a hydroxide of an alkali metal and separating the soluble products of reaction from the residual cellulosic solids.

7. A process for the treatment of cellulosic materials, comprising reducing the same to the condition of a pulp in the presence of an acid sulfite liquor, arresting the reaction of the liquor short of normal sulfite treatment, subjecting the resulting pulp to an alkaline liquor made from approximately equal proportions of a sulfite and a sulfide of an alkali metal and separating the soluble products of reaction from the residual cellulosic solids.

8. A process for the treatment of cellulosic materials, comprising reducing the same to the condition of a pulp in the presence of an acid sulfite liquor, arresting the reaction of the liquor short of normal sulfite treatment, subjecting the resulting pulp to an alkaline liquor made from approximately equal proportions of a sulfite and an alkaline compound of sodium and separating the soluble products of reaction from the residual cellulosic solids.

9. A process for the treatment of cellulosic materials, comprising reducing the same to the condition of a pulp in the presence of an acid sulfite liquor, arresting the reaction of the liquor short of normal sulfite treatment, subjecting the resulting pulp to an alkaline liquor made from approximately equal proportions of a sulfite and an alkaline compound of sodium in the aggregate concentration of approximately 3% by weight, and separating the soluble products of reaction from the residual cellulosic solids.

10. A process for the treatment of cellulosic materials, comprising reducing the same to the condition of a pulp in the presence of an acid sulfite liquor, arresting the reaction of the liquor short of normal sulfite treatment, subjecting the resulting pulp to an alkaline liquor made from approximately equal proportions of sodium sulfite and sodium hydroxide and separating the soluble products of reaction from the residual cellulosic solids.

11. A process for the treatment of cellulosic materials, comprising reducing the same to the condition of a pulp in the presence of an acid sulfite liquor, arresting the reaction of the liquor short of normal sulfite treatment, subjecting the resulting pulp to an alkaline liquor made from approximately equal proportions of sodium sulfite and sodium sulfide and separating the soluble products of reaction from the residual cellulosic solids.

12. A process for the treatment of cellulosic materials, comprising reducing the same to the condition of a pulp in the presence of an acid sulfite liquor, arresting the reaction of the liquor short of normal sulfite treatment, subjecting the resulting pulp to an alkaline liquor made from approximately equal proportions of sodium sulfite and sodium hydroxide in the aggregate concentration of approximately 3% by weight, and separating the soluble products of reaction from the residual cellulosic solids.

13. A process for the treatment of cellulosic materials, comprising reducing the same to the condition of a pulp in the presence of an acid sulfite liquor, arresting the reaction of the liquor short of normal sulfite treatment, subjecting the resulting pulp to an alkaline liquor made from approximately equal proportions of sodium sulfite and sodium sulfide in the aggregate concentration of approximately 3% by weight, and separating the soluble products of reaction from the residual cellulosic solids.

Signed by us at Bangor, Maine, this 30th day of January, 1926.

H. H. HANSON.
CHARLES A. BLODGETT.